United States Patent [19]
Markow et al.

[11] Patent Number: 5,930,376
[45] Date of Patent: *Jul. 27, 1999

[54] MULTIPLE CHANNEL SPEAKER SYSTEM FOR A PORTABLE COMPUTER

[75] Inventors: Mitchell A. Markow, Spring; Steven S. Homer, Cypress, both of Tex.

[73] Assignee: Compaq Computer Corporation, Houston, Tex.

[*] Notice: This patent is subject to a terminal disclaimer.

[21] Appl. No.: 08/810,430

[22] Filed: Mar. 4, 1997

[51] Int. Cl.$^6$ .................................................. H04R 1/02
[52] U.S. Cl. .......................... 381/333; 381/337; 381/338; 381/350
[58] Field of Search .................................. 381/190, 182, 381/332, 333, 338, 337, 350; 181/183, 199

[56] References Cited

U.S. PATENT DOCUMENTS 5,638,456  6/1997  Conley et al. ............................ 381/332

Primary Examiner—Forester W. Isen
Attorney, Agent, or Firm—Vinson & Elkins L.L.P.

[57] ABSTRACT

A laptop computer is disclosed that includes an improved audio speaker system. The laptop computer typically is designed to have a first shell and a second shell that are attached together. Typically located within the first shell are a central processing unit, a keyboard, and other circuits such as a battery, a hard disk storage, and other connectors such as a PCMCIA slot. A video monitor is typically located in the second shell of the laptop computer and is coupled to the central processing unit via a system bust, or a video driver is provided that may be subsequently coupled to the CPU, such that the video driver drives the video monitor. Then, an audio speaker system is provided that in one embodiment is mounted in a back portion of the second shell that is located opposite the video monitor. This audio speaker system includes a transmission line comprising a first piezo speaker and a second piezo speaker. The transmission line is set at such a distance so that the first piezo speaker can cover a selected range of frequencies while the second piezo speaker is set at a second distance in such a manner as to skew the frequency response between the first piezo speaker and the second piezo speaker, thereby providing frequency overlap to occur between the two speakers.

26 Claims, 4 Drawing Sheets

MULTIPLE CHANNEL SPEAKER SYSTEM FOR A PORTABLE COMPUTER

RELATED APPLICATIONS

This application is related to co-pending application Ser. No. 08/810,432, filed on Mar. 4, 1997, entitled "THIN FILM SPEAKER APPARATUS FOR USE IN A THIN FILM VIDEO MONITOR DEVICE" and incorporated by reference herein.

FIELD OF THE INVENTION

The present invention relates generally to audio systems implemented in computer systems and, more particularly, an audio sound system for use in a portable computer. More particularly still, the present invention relates to an audio system using multiple channels to increase audio fidelity in portable laptop-type computers having a limited form factor for optimizing audio sound.

PRIOR ART

Multimedia computers have now arrived in laptop computer systems. These multimedia computer systems typically have color LCD display panels, CD ROM drives, and audio speaker systems. Before the arrival of multimedia integrated systems in laptop computers, most laptop computers had merely a single audio source or audio output means that had very limited dynamic range. Further, a sound card capable of reproducing true high fidelity sound was typically lacking in most laptop computers. With the advent of multimedia systems, these improved sound card systems have been integrated into laptop computers, as well as the addition of stereo high fidelity sound.

Unfortunately, laptop computers have a limited form factor, typically the size of a notebook or a single sheet of paper roughly conforming to the dimensions of 8½×11 inches, thus a limited surface area or space is available for adding speakers. Currently, the LCD display panels are of such a size that room is still afforded on the monitor panel of the laptop to incorporate two small speakers in either corner. As the LCD technology enlarges the size of the monitors, the full face on the inside panel of the monitor display will be completely filled with the monitor itself. This will leave no room for speakers at on the panel facing the user. Additionally, the location of the speakers in most laptops is not ideal with respect to optimizing the frequency response and dynamic range, as well as the spacial separation of the sound. The speakers are placed relatively close within one foot of each other in the corners of the monitor display lid.

One approach has been to switch from speaker elements that use a moving diaphragm as found in conventional speakers to piezo speakers.

Piezo speakers typically are thin polymer sheets (PVDF) or ceramic disks that can be mounted virtually anywhere as compared to diaphragm-type conventional speakers that must be given a set room for the magnet and voice rail excursion requirements. Further, with the thinness of the piezo speakers, the form factor of the top on the laptop computer can be substantially dedicated to the display screen itself, where the piezo speakers can be mounted somewhere out of view.

Unfortunately, even with the advent of piezo speakers in laptop computers, other problems are inherent. These problems include the distortion and lack of high fidelity that occur with piezo speakers. Typically, piezo speakers have limited low end due to excursion limitations, but are most adequate at achieving high-end frequency response. It is this low-end frequency response as well as the acoustics of the laptop cover that are still challenges in implementing piezo speakers in laptop computers. For this reason, there is a strong need to improve the high fidelity sound system in laptop computers by way of improving the performance of either piezo speakers or by providing an alternative speaker design that conforms to the expanding screen size located in the cover of the laptop and yet provides full rich sound in a portable and limited multimedia environment.

SUMMARY OF THE INVENTION

According to the present invention, a laptop computer is disclosed that includes an improved audio speaker system. The laptop computer typically is designed to have a first shell and a second shell that are attached together. Typically located within the first shell are a central processing unit, a keyboard, and other circuits such as a battery, a hard disk storage, and other connectors such as a PCMCIA slot. A video monitor is typically located in the second shell of the laptop computer and is coupled to the central processing unit via a system bust or a video driver is provided that may be subsequently coupled to the CPU, such that the video driver drives the video monitor. Then, an audio speaker system is provided that in one embodiment is mounted in a back portion of the second shell that is located opposite the video monitor. This audio speaker system includes a transmission line comprising a first piezo speaker and a second piezo speaker. The transmission line is set at such a distance so that the first piezo speaker can cover a selected range of frequencies while the second piezo speaker is set at a second distance in such a manner as to skew the frequency response between the first piezo speaker and the second piezo speaker, thereby providing frequency overlap to occur between the two speakers.

Within the audio speaker system, the first piezo speaker transducer may be aligned so as define a first channel, and the second piezo speaker transducer can be aligned to define a second channel. The first and second channels are defined to provide a right and a left channel for stereo imaging of the sound emanating from the two speakers. Additional channels may be provided in the sound system.

Within the sound system, where more than two channels are provided, as many as five separate channels may be provided and can conform to the AC3 sound processing system developed by Dolby Systems. Additionally, the transmission line can be mounted in such a way as to fit along a first outer edge of the second shell in order to provide ample room for the video monitor panel within the laptop computer.

With the piezo speakers located in the back panel of the top shell, they can be mounted in such a fashion as to direct the sound pressure away from a user when the second shell is in an upright orientation, thus increasing stereo separation and spatial separation.

Although the first embodiment is that of a laptop computer, the audio speaker system can be located in a desktop monitor where either the desktop monitor has a video monitor display having a thin film form factor or even just located in any flat panels that are adjacent to the video monitor display screen such as the back panel or the side panels of any standard cathode ray tube display.

In the one embodiment, the speakers are located in the back panel of the top shell. In other embodiments, the speakers can be placed in flaps that extend out from the top shell or even from the bottom shell or can be located in a hand rest that fits before the key pad in such a way as to provide sound from the bottom shell. When the speakers are located in the wrist pad, being that they are piezo transducers, the sound quality transmits through the user's hands as if the hands are transparent, thus overcoming the degradation that would otherwise occur in speakers having moving diaphragms.

DETAILED DESCRIPTION OF THE PRESENT INVENTION

Figure 1:
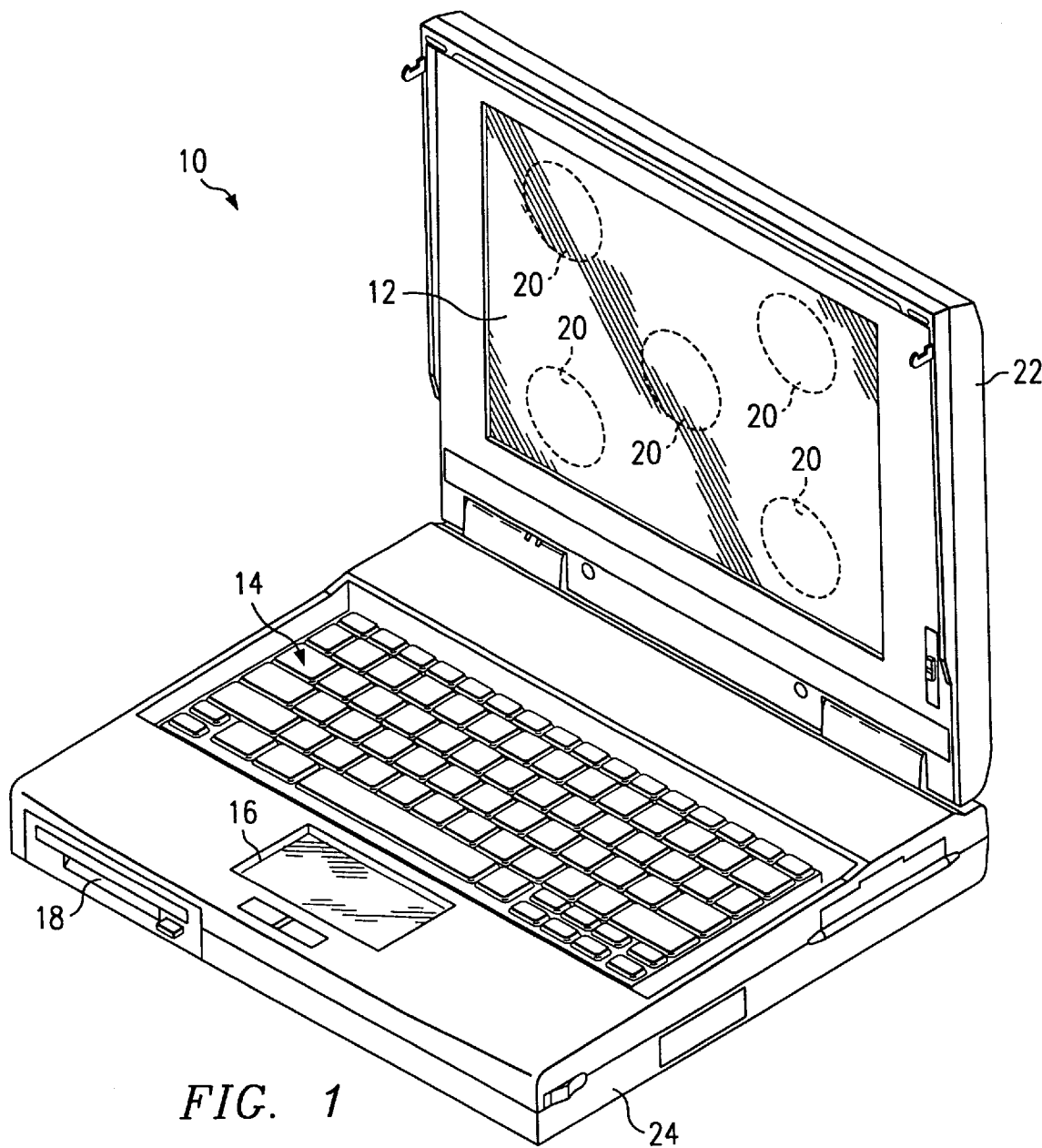
FIG. 1 illustrates a laptop computer having an audio speaker system incorporated therein according to the present invention.

Illustrated now in FIG. 1 is a multimedia laptop computer 10 according to the present invention. The laptop computer 10 is a multimedia-type computer having a monitor display panel 12, a keyboard 14, a pointing device 16, disk storage means 18, and audio speakers 20. The disk storage means 18 may include various types of disk storage technology such as a floppy disk drive, a hard disk drive, or a compact disk read only memory (CD-ROM) drive, or other type writeable or erasable storage devices typically known to those skilled in the art. Keyboard 14 provides data input for the user as does pointing device 18. Further, video monitor display panel 12 is of the type that fill substantially the shell top 22 of laptop computer 10. The keyboard 14, pointing device 16, and storage device normally are located in the shell bottom 24 of computer 10.

Within computer 10 there are other various devices for operation. These devices include a central processing unit, such as those typically provided by the Intel family of personal computing microprocessors such as the Pentium chip or the IBM Power PC chip also found in laptop computers. Additionally, short-term memory that is fast and responsive to the same operating speed as the CPU are also included as is a mass storage unit, typically the hard disk drive 18 previously described above. Additional control elements and peripherals are incorporated in the computer, and the fundamental construction of a laptop computer does not diverge substantially from those typically well-known to those skilled in the art. Their location is in shell bottom 24.

Figure 2:
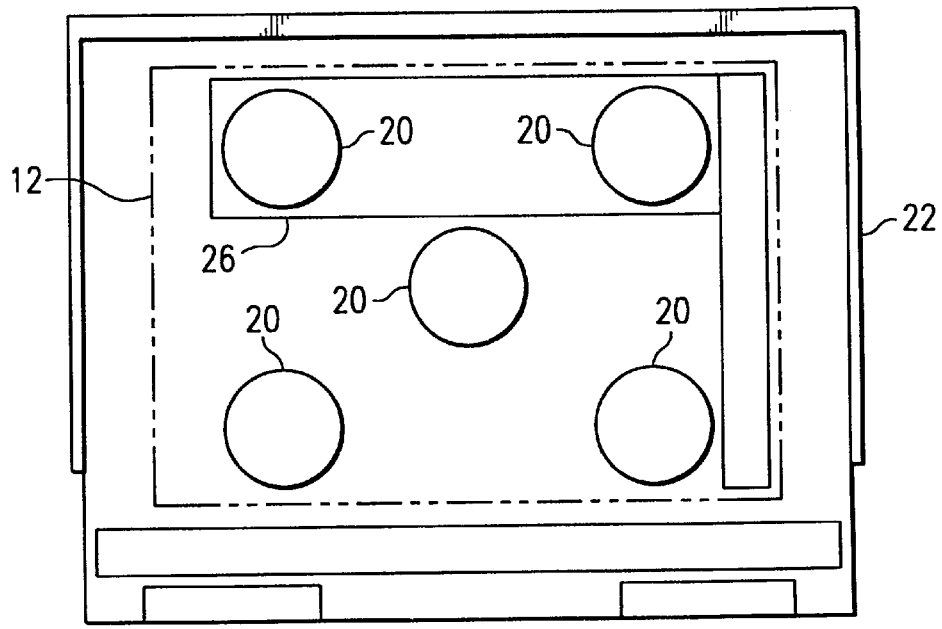
FIG. 2 depicts an open view of the shell top of the laptop computer in FIG. 1.

Shown in greater detail in FIG. 2 is the audio output system incorporated in the shell top 22 laptop computer 10. The audio output system includes the piezo speakers 20 thus depicted. FIG. 2 illustrates an open view of the shell top 24, which doubles as the lid on the laptop computer 10, in such a manner as to locate the piezo speakers ideally in a form factor consistent with the ever enlarging monitor display panel 12 of computer 10. The speakers 20 are located in such a manner as to provide sound imaging away from the laptop operator during operation. This is so because in the functioning mode, the laptop cover is open for the user to view screen 12. In this mode, the top of the laptop computer faces away from the user and thus allows the speakers to direct the sound away from the user. Increase spatial imaging is now possible with the sound directed away from the user and then reflected back from the walls or furniture, or both, surrounding the user. Moreover, in a presentation environment, the speakers that project away from the user are ideally situated to project towards the audience during the presentation.

Although the speakers have been shown to be implemented in the back of the LCD panel, it is understood that the piezo speakers may be mounted in other places besides the monitor housing. For example, the piezos may be mounted on the LCD screen itself or on the palm rests in the base unit. Further, wings may also be attached to the laptop computer in such a way as to provide mounting for the piezo speakers and can be thin enough that they would be easily transported with the user for attachment and operation.

Figure 8:
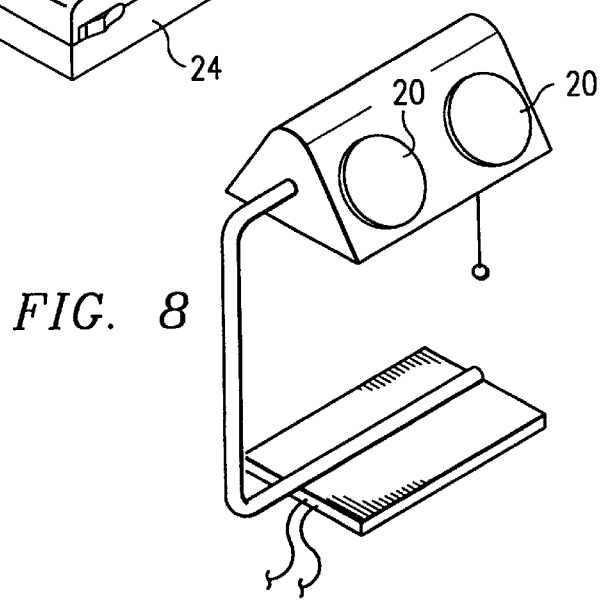
FIG. 8 depicts the speakers placed in an alternate embodiment such as a desktop lamp fixture.

When the speakers 20 are mounted in the palm rests, as illustrated in FIG. 8, the sound transmits almost transparently through a user's hands. The placement of speakers 20 in the palm rests is optional, but does have unintended benefits since the sound travels through the user's hands with minimal distortion or diminution in volume as compared to diaphragm speakers.

In attaching the speakers to the back of the shell top 22, they may actually be designed into the top cover in such a way as to be manufactured in a single step when the cover itself is manufactured. Additionally, lead wires from the audio output source, typically mounted on the circuit board within the main unit of the laptop computer 10 typically located under the keyboard section, are attached with flexible cable wired in the panels.

A transmission line 26 is provided to enhance the richness and acoustic response of piezo speakers 20. The transmission line illustrated in FIG. 2 allows for piezo speakers 20 in the back of the shell top 22 of laptop computer 10 to be ported in the front of the monitor panel. This transmission line provides a simple single-sided transmission line labyrinth that is suitable for the thin form factor provided in the monitor panel. Since there is little depth allowed in the monitor panel, the transmission line is most suitable as boundary areas decrease. The transmission line can be tuned to the same of different frequency depending on the desires of the manufacturer or the end user.

Figure 3A:
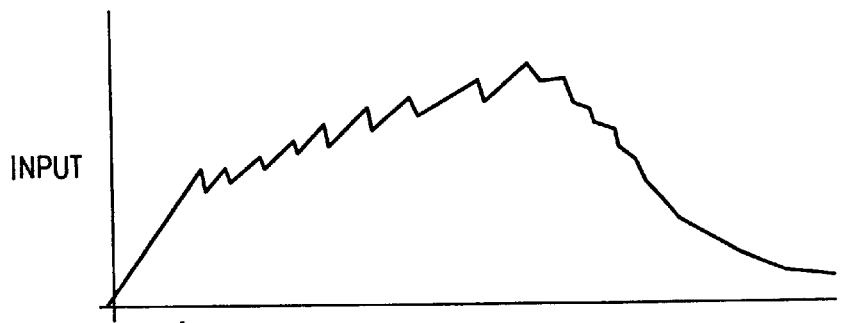
FIG. 3 depicts a graph showing how two speakers are connected with a transmission line having different lengths so as to provide frequency overlap.
Figure 3B:
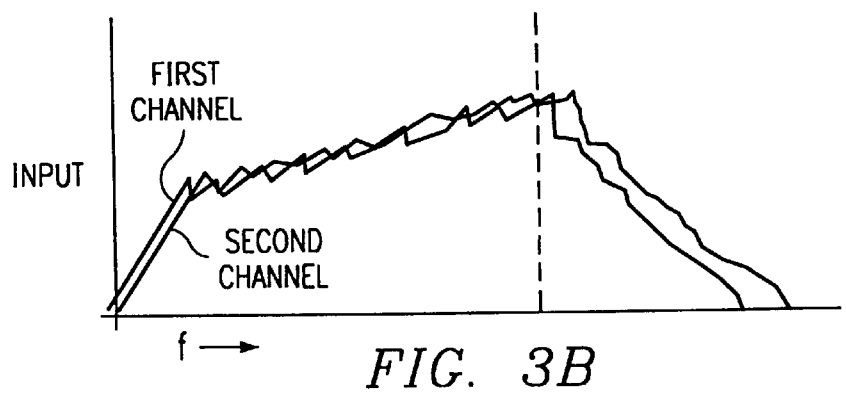

A transmission line is useful in that it allows for a pair of speakers to fill in a frequency response range that typically misses particular frequencies due to the lack of excursion otherwise capable. This is so in that the transmission line is adjusted so that there is set at a ratio of one length to another length between the two speakers so that a fine tuning occurs to overlap the frequency responses between the two speakers in an attempt to fill in the gaps. This is illustrated in the graph shown in FIG. 3A. In FIG. 3A, the input signal is skewed over a certain frequency range so as to fill in the gaps and the responses shown in FIG. 3B where an additional filter may be employed to cut off any part of the wave that cannot be skewed substantially in a usable manner. Where two speakers are now linked via the transmission line, an increased sound image is generated than would otherwise be possible without the use of the transmission line.

Figure 4:
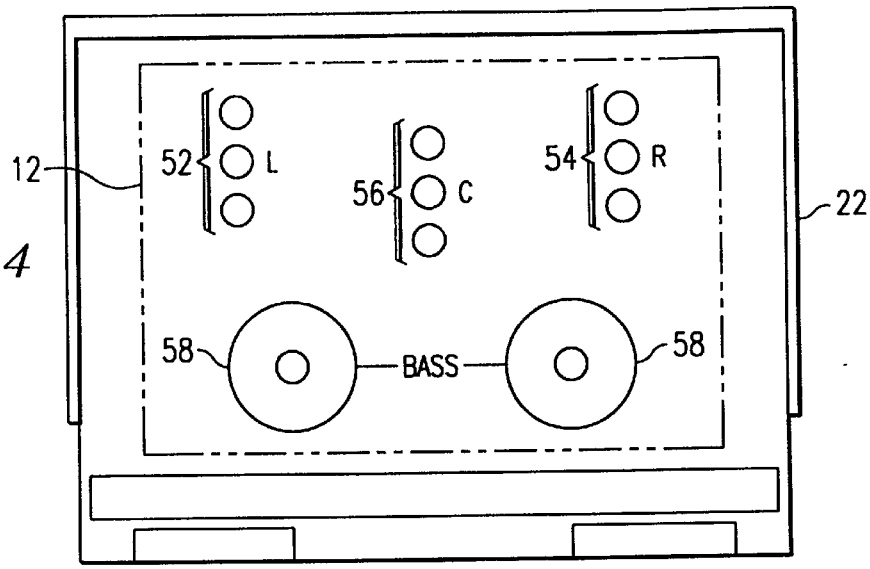
FIG. 4 depicts a multiple channel embodiment of the sound system according to the present invention.

Furthermore, an improved sound processing arrangement has been implemented and is known as AC3, developed by Dolby Labs, which provides for five-channel prologic sound synthesizing. In this AC3 system, five separate channels may be used, which gives the audio system designer the ability to fine tune the sound system in a manner where the sound overlap or cancelization can optimize the actual sound heard and enjoyed by the system user. For example, one embodiment is depicted in FIG. 4 that includes a first or left channel 52, a second or right channel 54, and a center or third channel 56. Additionally, a bass channel 58 may be provided by using two separate channels, each driving the same bass response frequency in bass speaker 60. It has been shown in this embodiment to use five separate channels. The system may have as few as one channel but ideally would have at least three channels, being one for the left signal, one for the right signal and one for the bass response. Additionally, other channel configurations may be implemented by the designer according to the needs of the system.

Figure 5:
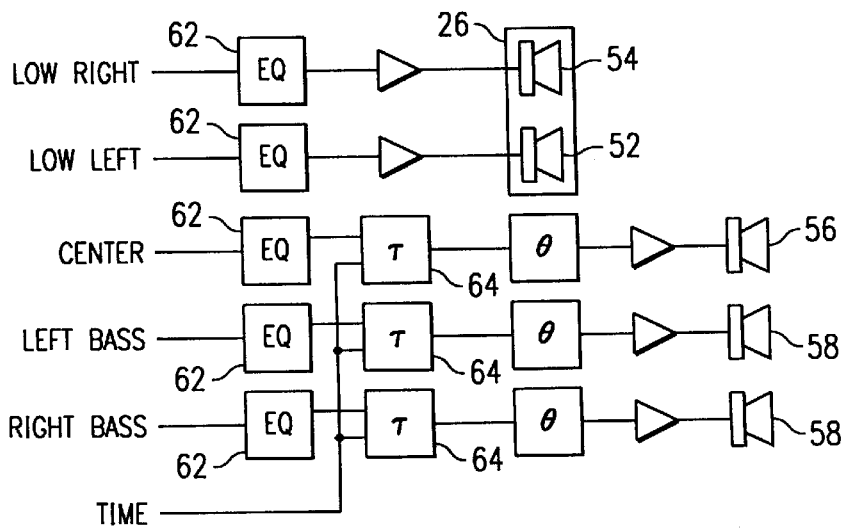
FIG. 5 illustrates in block diagram form the use of a time delay element and sound equalizer for optimizing sound in the audio sound system.

Each channel is adjusted for optimal polar pattern placement, which can use multiple piezo transducers. In this example, each of the left channel, center channel, and right channels include three discrete piezo speakers. All these speakers are placed on the back of the laptop computer monitor panel. Furthermore, a dedicated sound equalizer 62, shown in FIG. 5, is provided for each channel. Typically, a time delay 64 and sound equalization 62 is provided and is illustrated in the block diagram of FIG. 5. In FIG. 5, a lower right channel is provided sound equalization and then time delay, where the lower left channel then also is provided sound equalization and time delay and then are outputted to their various actual speaker units or piezo transducers. Additionally, the center speaker 56 also receives sound equalization with a time delay, as does the left and the right bass speakers 58.

Furthermore, the piezo speaker transducers are customized and optimized for the acoustic image desired to be achieved and would be well within the skilled artisan's ability to match such optimization once the desired sound acoustic image is established.

Figure 6:
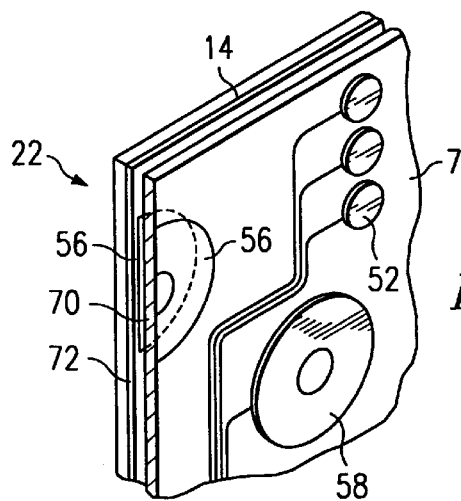
FIG. 6 depicts, in a cut-away perspective view, the aluminum honeycomb support used in the top shell of the computer in FIG. 2.

The monitor lid top shell 22 of FIG. 2 further includes an aluminum honeycomb support 70, which is illustrated in cut away perspective view in FIG. 6, that provides two functions. The aluminum honeycomb support first provides a stiffening of the plastic shell in which the LCD monitor is mounted. Secondly, the aluminum honeycomb sheet improves sound reproduction by lowering the natural frequency response ($f_o$) to increase the $N_{rad}$ efficiency and to optimize power efficiency from the piezo speaker to the shell top 22. The thickness of support 70 is between 0.125"–0.250" Further provided in the monitor shell top 22 is electromagnetic interference (EMI) shield 72 displaced between the speakers 20 and the LCD monitor panel 18. Further provided is a plastic enclosure 74 over the entire assembly to top shell 22.

With the aluminum honeycomb support 70, piezo speakers 20 may be mounted on either side, and in some embodiments may be mounted opposite each other on different sides. Other types of support 70 may be constructed from polycarbonate or ABS plastic, or even magnesium.

Afterwards, the piezo transducers 20 may also be tuned to be out of phase so as to increase banding to achieve greater channel separation. Next, the boundary conditions are examined due to the LCD/panel air gaps and then appropriate dampening and stiffening are then performed. Next, boundary conditions are then investigated to determine whether the panel attachment points cause undesired effects so that additional dampening and reaction forces can be counteracted to optimize the spatial sound and quality of the sound volume. This achieve by a mechanical dampening of stiffener panel support 70 or modifies the relative phases between the drivers. Further, the modal energy is optimized in the lower frequencies by preserving modal density and increasing radiation efficiency through the use of stiffening support 70.

Although it has been described for use in a laptop computer, the transmission line system thus illustrated would also be applicable to any environment where a thin form factor, i.e., lacking depth, would be ideal for the use of piezo speaker transducers. This would be suitable where a simple LCD monitor has been designed for desk-top use and cumbersome speakers would be inappropriate for placement on the desk top itself. The speaker design would be added to such an LCD desk-top monitor and provide the same quality of sound when customized to that particular monitor enclosure used with the LCD monitor. This preserves valuable desk-top space otherwise required by the placement of speakers.

Figure 7:
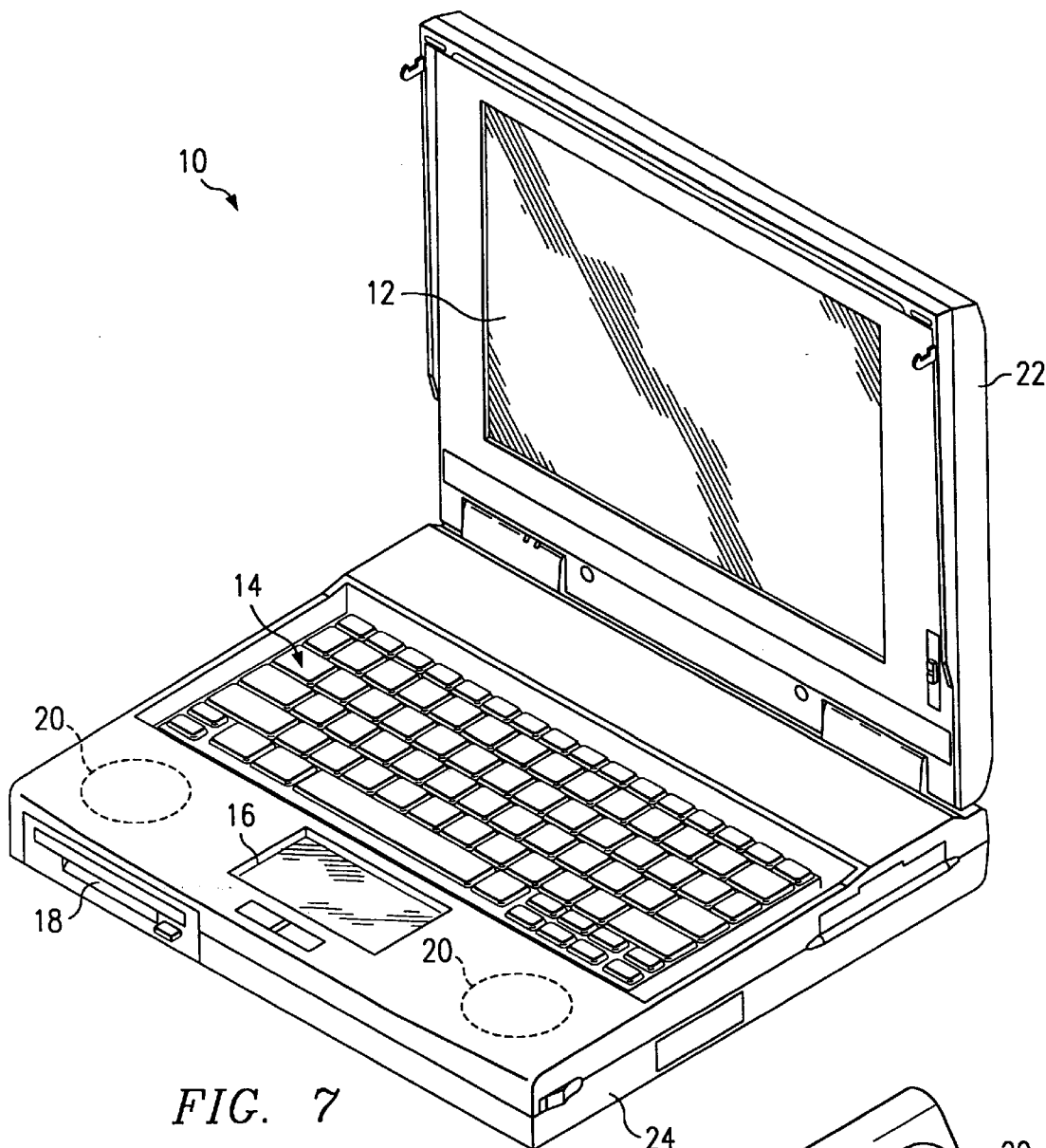
FIG. 7 depicts the placement of the speakers in a rest support in a computer.

Additionally, where any flat surface is available that is typically associated with a user, for example, a desk-top lamp fixture shown in FIG. 7, the piezo electric speakers can be mounted on the top surface of the sound fixture to provide sound directed towards the user or off a flat surface for improved sound separation.

Thus has been described a novel sound system for use ins limited form-factor environments, such as laptop computers, that uses multiple channels, transmission lines, and custom tuning. The foregoing disclosure and description of the invention are illustrative and explanatory thereof, and various changes in the size, shape, materials, components, circuit elements, wiring connections and contacts, as well as the details of the illustrated design and construction and method of operation may be made without departing from the spirit of the invention.

What is claimed:

1. A laptop computer having a first shell and a second shell attached together and further comprising;
    a central processing unit located in said first shell;
    a keyboard, located in said first shell;
    a video monitor, located in said second shell of said laptop computer, coupled to said central processing unit, and driven by a video driver further coupled to said central processing unit; and
    an audio speaker system, mounted to a back portion of said second shell opposite said video monitor, and including a transmission line comprising a first piezo speaker transducer and a second piezo speaker transducer, said transmission line setting a first distance for said first piezo speaker transducer and a second distance for said second piezo speaker transducer in such a manner as to skew the frequency response between said first piezo speaker transducer and said second piezo speaker transducer so as to allow overlapping of frequencies between the two speaker transducers.

2. A laptop computer according to claim 1 further comprising:
    a first channel corresponding to said first piezo speaker transducer; and
    a second channel corresponding to said second piezo speaker transducer.

3. A laptop computer according to claim 1 wherein said transmission line further comprises a sound chamber located along a first edge of said second shell.

4. A laptop computer according to claim 2 wherein first channel corresponds to a left channel, and said second channel corresponds to a right channel for providing stereo imaging of said sound emanating from said first piezo speaker transducer and said second piezo speaker transducer.

5. A laptop computer according to claim 1 wherein said audio speaker system includes up to five separate channels and conforms to the AC3 sound processing system.

6. A laptop computer according to claim 1 wherein said audio speaker system provides for said speaker transducers to be mounted in such a fashion as to direct the sound pressure away from a user when said second shell is in an upright orientation for allowing said user to view said video monitor.

7. A computer monitor system having an audio speaker system mounted therein, comprising:
  a video monitor display screen having a thin film form factor located in a first portion of said video monitor;
  a second portion adjacent and behind said video monitor screen for mounting opposite said video monitor a first piezo speaker transducer and a second piezo speaker transducer having a transmission line connecting said first piezo speaker transducer to said second piezo speaker transducer in such a manner as a first distance is provided for said first piezo speaker transducer, and a second distance for said second piezo speaker transducer so as to skew the frequency response between said first piezo speaker transducer compared to said second piezo speaker transducer so as to fill in any missing frequencies from either of said speaker transducers.

8. A laptop computer according to claim 7 further comprising:
  a first channel corresponding to said first piezo speaker transducer; and
  a second channel corresponding to said second piezo speaker transducer.

9. A laptop computer according to claim 8 wherein said transmission line further comprises a sound chamber located along a first edge of said second shell.

10. A laptop computer according to claim 7 wherein first channel corresponds to a left channel, and said second channel corresponds to a right channel for providing stereo imaging of said sound emanating from said first piezo speaker transducer and said second piezo speaker transducer.

11. A laptop computer according to claim 7 wherein said audio speaker system includes up to five separate channels and conforms to the AC-3 sound processing system.

12. A laptop computer according to claim 7 wherein said audio speaker system provides for said speaker transducers to be mounted in such a fashion as to direct the sound pressure away from a user when said second shell is in an upright orientation for allowing said user to view said video monitor.

13. An audio speaker system for use in a computer component having a limited form factor, said audio speaker system comprising:
  a first piezo speaker transducer mounted on a first position of said computer component;
  a second piezo speaker transducer mounted to a second location of said computer component;
  a transmission line connecting said first piezo speaker transducer to said second piezo speaker transducer and having a first distance for said first piezo speaker transducer and a second distance for said second piezo speaker transducer so as to overlap frequencies between said first and second piezo speaker transducers.

14. A laptop computer according to claim 13 further comprising:
  a first channel corresponding to said first piezo speaker transducer; and
  a second channel corresponding to said second piezo speaker transducer.

15. A laptop computer according to claim 13 wherein said transmission line further comprises a sound chamber located along a first edge of said second shell.

16. A laptop computer according to claim 14 wherein first channel corresponds to a left channel, and said second channel corresponds to a right channel for providing stereo imaging of said sound emanating from said first piezo speaker transducer and said second piezo speaker transducer.

17. A laptop computer according to claim 13 wherein said audio speaker system includes up to five separate channels and conforms to the AC-3 sound processing system.

18. A laptop computer according to claim 13 wherein said audio speaker system provides for said speaker transducers to be mounted in such a fashion as to direct the sound pressure away from a user when said second shell is in an upright orientation for allowing said user to view said video monitor.

19. The audio speaker system according to claim 13 wherein said transmission line is a single-sided labyrinth.

20. A laptop computer having a first shell and a second shell attached together and further comprising;
  a central processing unit located in said first shell;
  a keyboard, located in said first shell;
  a video monitor, located in said second shell of said laptop computer, coupled to said central processing unit, and driven by a video driver further coupled to said central processing unit; and
  an audio speaker system, mounted to a front portion of said first shell and including a transmission line comprising a first piezo speaker transducer and a second piezo speaker transducer, said transmission line setting a first distance for said first piezo speaker transducer and a second distance for said second piezo speaker transducer in such a manner as to skew the frequency response between said first piezo speaker transducer and said second piezo speaker transducer so as to allow overlapping of frequencies between the two speaker transducers.

21. A laptop computer according to claim 20 further comprising:
  a first channel corresponding to said first piezo speaker transducer; and
  a second channel corresponding to said second piezo speaker transducer.

22. A laptop computer according to claim 20 wherein said transmission line further comprises a sound chamber located along a first edge of said second shell.

23. A laptop computer according to claim 21 wherein first channel corresponds to a left channel, and said second channel corresponds to a right channel for providing stereo imaging of said sound emanating from said first piezo speaker transducer and said second piezo speaker transducer.

24. A laptop computer according to claim 20 wherein said audio speaker system includes up to five separate channels and conforms to the AC3 sound processing system.

25. A laptop computer according to claim 20 wherein said audio speaker system provides for said speaker transducers to be mounted in such a fashion as to direct the sound pressure away from a user when said second shell is in an upright orientation for allowing said user to view said video monitor.

26. A laptop computer according to claim 20 wherein said front portion of said first shell provides for a rest pad for a user when using said keyboard.

* * * * *